US008805740B2

(12) United States Patent
Davis et al.

(10) Patent No.: US 8,805,740 B2
(45) Date of Patent: *Aug. 12, 2014

(54) MOBILE DEVICE CREDIT ACCOUNT

(71) Applicants: Martin Davis, Charlotte, NC (US); Michael Thomas Duke, Monroe, NC (US)

(72) Inventors: Martin Davis, Charlotte, NC (US); Michael Thomas Duke, Monroe, NC (US)

(73) Assignee: Wells Fargo Bank, N.A., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/851,639

(22) Filed: Mar. 27, 2013

(65) Prior Publication Data

US 2013/0212016 A1 Aug. 15, 2013

Related U.S. Application Data

(63) Continuation of application No. 12/705,709, filed on Feb. 15, 2010, now Pat. No. 8,429,071, which is a continuation of application No. 11/943,362, filed on Nov. 20, 2007, now Pat. No. 7,689,508.

(51) Int. Cl.
| | |
|---|---|
| *G06Q 40/00* | (2012.01) |
| *G06Q 40/04* | (2012.01) |
| *G06Q 40/06* | (2012.01) |
| *G06Q 20/10* | (2012.01) |
| *G06Q 20/32* | (2012.01) |
| *G06Q 20/40* | (2012.01) |
| *G06Q 30/06* | (2012.01) |

(52) U.S. Cl.
CPC ........ *G06Q 20/3223* (2013.01); *G06Q 20/1085* (2013.01); *G06Q 20/10* (2013.01); *G06Q 40/00* (2013.01); *G06Q 20/40* (2013.01); *G06Q 30/06* (2013.01); *G06Q 40/12* (2013.01)
USPC .......................................................... 705/42

(58) Field of Classification Search
CPC ........ G06Q 40/00; G06Q 40/04; G06Q 40/06
USPC .......................................................... 705/42
See application file for complete search history.

(56) References Cited

U.S. PATENT DOCUMENTS 5,991,749 A * 11/1999 Morrill, Jr. ..................... 705/44
7,184,747 B2    2/2007 Bogat
(Continued)

FOREIGN PATENT DOCUMENTS

| WO | WO 01/63520 | * | 8/2001 | ............. G06F 17/60 |
|---|---|---|---|---|
| WO | 03046777 A2 | | 6/2003 | |
| WO | 03049364 A1 | | 6/2003 | |

OTHER PUBLICATIONS

WO 01/063520.*

(Continued)

*Primary Examiner* — James A Vezeris
*Assistant Examiner* — Clifford Madamba
(74) *Attorney, Agent, or Firm* — Kegler Brown Hill & Ritter; James J. Pingor

(57) ABSTRACT

Providing for a mobile communication device (MCD) credit account and credit transactions by way of such an MCD is described herein. As an example, a credit account sponsored by a financial or commercial entity can be associated with a unique ID of an MCD. The MCD can interface with another electronic device and initiate credit transactions, such as commercial purchases, credit transfers, currency conversions, and the like, via the interface. Further, rules provided by the sponsoring entity can guide such transactions, enforcing credit limits, for instance. A management component can then synchronize transactions conducted by the device with a server of a financial institution over a remote communication interface, such as the Internet or a cellular/mobile communication network. Accordingly, a mobile device can replace a traditional credit card in transacting credit business.

17 Claims, 11 Drawing Sheets

(56) References Cited

U.S. PATENT DOCUMENTS

| | | | |
|---|---|---|---|
| 7,464,861 | B2 | 12/2008 | Gindi |
| 2002/0181710 | A1* | 12/2002 | Adam et al. .................. 380/270 |
| 2005/0154674 | A1* | 7/2005 | Nicholls et al. ................. 705/43 |
| 2006/0235785 | A1 | 10/2006 | Chait et al. |
| 2007/0255653 | A1* | 11/2007 | Tumminaro et al. ............ 705/39 |
| 2007/0255662 | A1 | 11/2007 | Tumminaro et al. |
| 2007/0265984 | A1 | 11/2007 | Santhana |

OTHER PUBLICATIONS

Go mobile with your money. That's the simple yet powerful idea behind Obopay. https://ww.obopay.com/corporate/aboutUs.shtml. Last accessed Feb. 20, 2008.

Obopay Mobile Payment Service. An Innovative Electronic Payment System for Mobile Users. Published: Nov. 2005.

Obopay Secures $29 Million in Third Round of Funding. Obopay, Inc. Last accessed Feb. 20, 2008.

Mobile Banking. <http://en.wikipedia.org/wiki/Mobile_banking> Last accessed Dec. 12, 2007.

Roberto Di Pietro, et al. A Two-Factor Mobile Authentication Scheme for Secure Financial Transactions. <http://ieeexplore.ieee.org/Xplore/login.jsp?url=/iel5/9999/32116/01493584.pdf&arnumber=1493584> Last accessed Dec. 12, 2007.

Mobile solution to enhance security in online financial transactions. Nov. 11, 2005. <http://www.gadgetguy.de/2005/11/11/mobile-solution-to-enhance-security-in-online-financial-transactions/>.

Sybase iAnywhere. Software Development Kit for Implementing Infrared for Financial Messaging (IrFM). <http://www.ianywhere.com/datasheets/irfm_sdk.html> Last accessed Dec. 12, 2007.

State of Telecom Industry in Pakistan. <http://telecompk.net/2007/04/18/financial-transaction-on-your-phone/> Last accessed Dec. 12, 2007.

MeT Specification. Mobile electronic Transactions. <http://www.cellular.co.za/technologies/met/met_spec.htm> Last accessed Dec. 12, 2007.

MeT. Mobile electronic Transactions. <http://www.cellular.co.za/technologies/met/met.htm> Last accessed Dec. 12, 2007.

* cited by examiner

MOBILE DEVICE CREDIT ACCOUNT

CROSS REFERENCE TO RELATED APPLICATIONS

The subject Application for Patent is a Continuation claiming priority to U.S. Non-Provisional patent application Ser. No. 12/705,709 entitled MOBILE DEVICE CREDIT ACCOUNT, filed on Feb. 15, 2010, which is a continuation of U.S. Non-Provisional patent application Ser. No. 11/943,362 entitled MOBILE DEVICE CREDIT ACCOUNT, filed on Nov. 20, 2007, now issued as U.S. Pat. No. 7,689,508, the entireties of which are incorporated herein by reference.

BACKGROUND

Recent advancements in mobile communication technology have enabled not only real-time, remote communication, but also an ability to accomplish such communication without utilizing a stationary telephonic device. Specifically, cellular technology, Bluetooth technology, and the like, have enabled individuals to travel and conduct remote, real-time communicate simultaneously. In addition to voice communication, remote digital information exchange in general has also been accomplished by way of such devices. As a result, the recent generation has aptly been characterized as an age of "information on the move".

As mobile communication devices, e.g., cell phones, smartphones, multi-mode phones, personal digital assistants (PDAs), etc., become more portable and more personal, such devices have become central to the new mobile communication age. For instance, mobile devices can be utilized to browse the Internet, shop online, and download songs, video, and the like. In addition, consumers can access electronic mail, instant messaging (IM), personal planning applications, such as calendars and task lists, entertainment applications, and so on; essentially, the mobile communication device has come to replace stationary personal computers in many aspects. As mobile device popularity increases, service providers also adapt to make their products and services accessible by way of such devices. However, the rate at which mobile computing and communication technology progresses is typically faster than the rate at which service providers can incorporate new applications for mobile technology; consequently, data services may not be fully leveraged at a given point in time for such devices.

In recent years, the world has also begun to transition to a cashless society. For instance, payroll checks no longer need to be physically printed, cut, and distributed to employees. Rather, electronic transfer to a bank account provides a more convenient mechanism to distribute, receive and deposit payroll funds. Similarly, other trends have greatly affected traditional banking in other respects. For example, in the not so recent past customers would personally visit a bank branch to receive personal service from a teller; today, such visits happen less frequently. Automated teller machines (ATMs) were responsible for the first transition away from personal teller service. Today, as the Internet continues to grow in popularity, online banking has become an additional mechanism to accomplish financial transactions without visiting a bank branch. Accordingly, 'personal banking' has become an additional aspect of modern society greatly impacted by the new digital information age.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Providing for a mobile communication device (MCD) credit account and financial credit transactions by way of such an MCD is described herein. As an example, a credit account sponsored by a financial or commercial entity can be associated with a unique ID of an MCD (e.g., mobile phone, smartphone, personal digital assistant (PDA) or the like). The MCD can couple with another electronic device over a remote communication interface and initiate credit transactions, such as commercial purchases, credit transfers, currency conversions, and the like. Further, rules provided by the sponsoring entity can guide such transactions, enforcing credit limits, for instance. A management component can then synchronize transactions conducted by the device with a server of a financial institution over the remote communication interface. As a result, an MCD can be utilized instead of a traditional credit card in transacting credit business.

According to further aspects, peer to peer credit transfer by way of an MCD is provided. A first MCD, having an associated credit account, can utilize a remote communication interface to couple with an electronic device also affiliated with a financial account. The electronic device can be an electronic server of a financial institution, an automated teller machine (ATM), an electronic cash register, a second MCD, and so on. A credit execution component can facilitate transfer of funds from the credit account to the financial account via the remote communication interface, and can update each account with the results of the transfer. The transfer can also incorporate encryption technology and security in order to mitigate a likelihood of fraudulent activity involved in the transfer. Accordingly, the subject innovation provides for a mobile, electronic credit mechanism suitable for modern electronic commerce.

In addition to the foregoing, one or more aspects of the subject disclosure provide for mobile credit convenience features incorporated into an MCD. Such a device can convert funds from one currency to another based on a location of the MCD, for instance. In addition, a credit account can be sub-divided into multiple accounts sponsored by different commercial or financial entities. The sub-divided accounts can be utilized to accrue benefits provided by such entities (e.g., discounts in transacting with a sponsoring entity, money-back benefits, frequent usage points, frequent traveler benefits, and so forth). An aggregation component can compile and manage accrued benefits and provide a review of such benefits to a user of an MCD. As a result, the user can be informed of the availability of such benefits on the MCD and optimize their use in MCD credit transactions.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
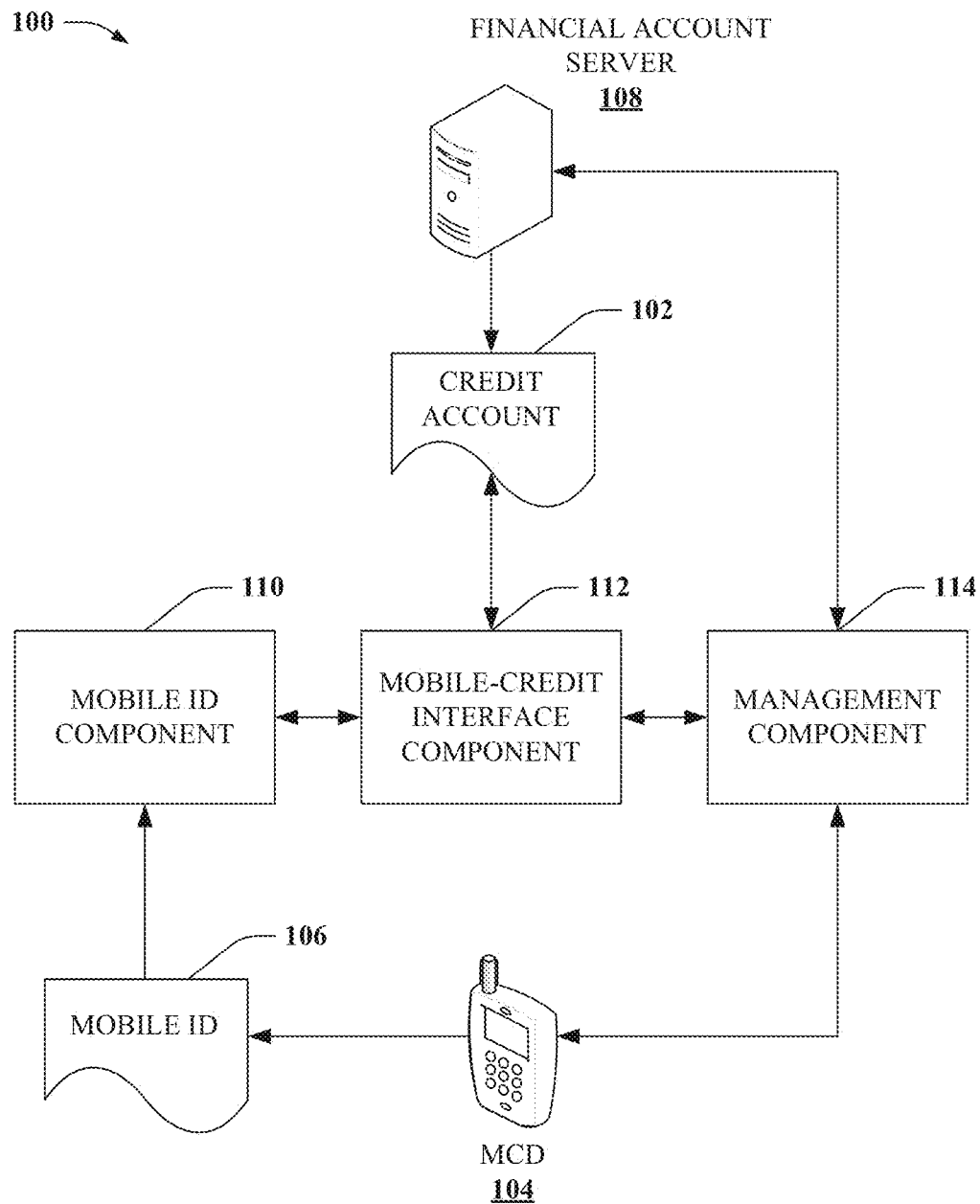
FIG. 1 illustrates a block diagram of an example system that associates a credit account with a mobile communication device (MCD) and facilitates credit transaction via the MCD.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, it should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of an ad-hoc or unplanned/semi-planned deployed wireless communication environment that provides synchronized transmission and retransmission of SFN data. One skilled in the art should appreciate that similar techniques could apply to other communication environments.

Referring now to FIG. 1, a block diagram of a sample system 100 is depicted that associates a credit account 102 with a mobile communication device (MCD) 104. The credit account 102 can be affiliated with an authorized service account (e.g., a mobile service agreement provided by a mobile communication service provider) of the MCD 104, for instance, or affiliated with a unique ID 106 of the MCD 104 that is correlated to a device user. In addition, the credit account 102 can be sponsored by a financial institution, commercial entity that provides credit services, or the like. Furthermore, system 100 can facilitate synchronization of account activity initiated at the MCD 104 with a server (108) of the financial and/or commercial entity sponsoring the credit account. Accordingly, system 100 can effect substitution of the MCD for a traditional credit card, facilitating remote and/or personal credit transactions and synchronization with a sponsoring server (108).

According to particular embodiments, system 100 can include a mobile identification component 110 that receives a unique ID 106 of an MCD 104. The unique ID 106 can be affiliated with a user of the MCD (not depicted), and identify both the MCD 104 as well as the user. In addition, the mobile identification component 110 can provide the unique ID 106 to a mobile-credit interface component 112 that associates a credit account 102 with the unique ID 106 of the MCD 104. The credit account can be any suitable mechanism, such as a personal credit limit, for extending financial credit to a consumer (including, e.g., an individual person, a business, a corporation, a non-profit organization, and so on). Furthermore, the consumer can be uniquely associated with the unique ID 106 of the MCD 104. For example, a service account of a mobile service provider (not depicted) can associate billing information for the consumer with the unique ID 106. Alternatively, or in addition, consumer credit information (e.g., social security number, personal identification number [PIN], etc.) can be associated with the unique ID 106. Accordingly, information related to credit history (e.g., loan history, payment schedules, delinquent or missed payments, and so on) can be accessed and reviewed by way of the unique ID 106. In such a manner, a financial institution or commercial lending agency can access personal and/or business information (e.g., credit history) involved in establishing the credit account 102.

In addition to the foregoing, system 100 can include a management component 114 that synchronizes a contemporaneous state of the credit account 102 at the MCD 104 and a state of the credit account 102 at a financial account server 108. Such contemporaneous state can include a concurrent credit limit, a credit balance, a recent credit transaction history including expenditures and payments to the credit account, or the like. More specifically, a time, amount, date, location (e.g., global positioning system [GPS] location) of a transaction, product(s)/service(s) involved, name of transacting entities (e.g., including the unique ID 106 and/or user PIN number, discussed above) including a merchant or vendor, or names or identification information associated with a private peer to peer transfer, or like information, can be determined for each credit transaction and can be recorded at the MCD 104. Such information can constitute the contemporaneous state of the credit account 102. Any of such information, or like transaction related information, can be synchronized at the financial account server 108 by management component 114.

Figure 2:
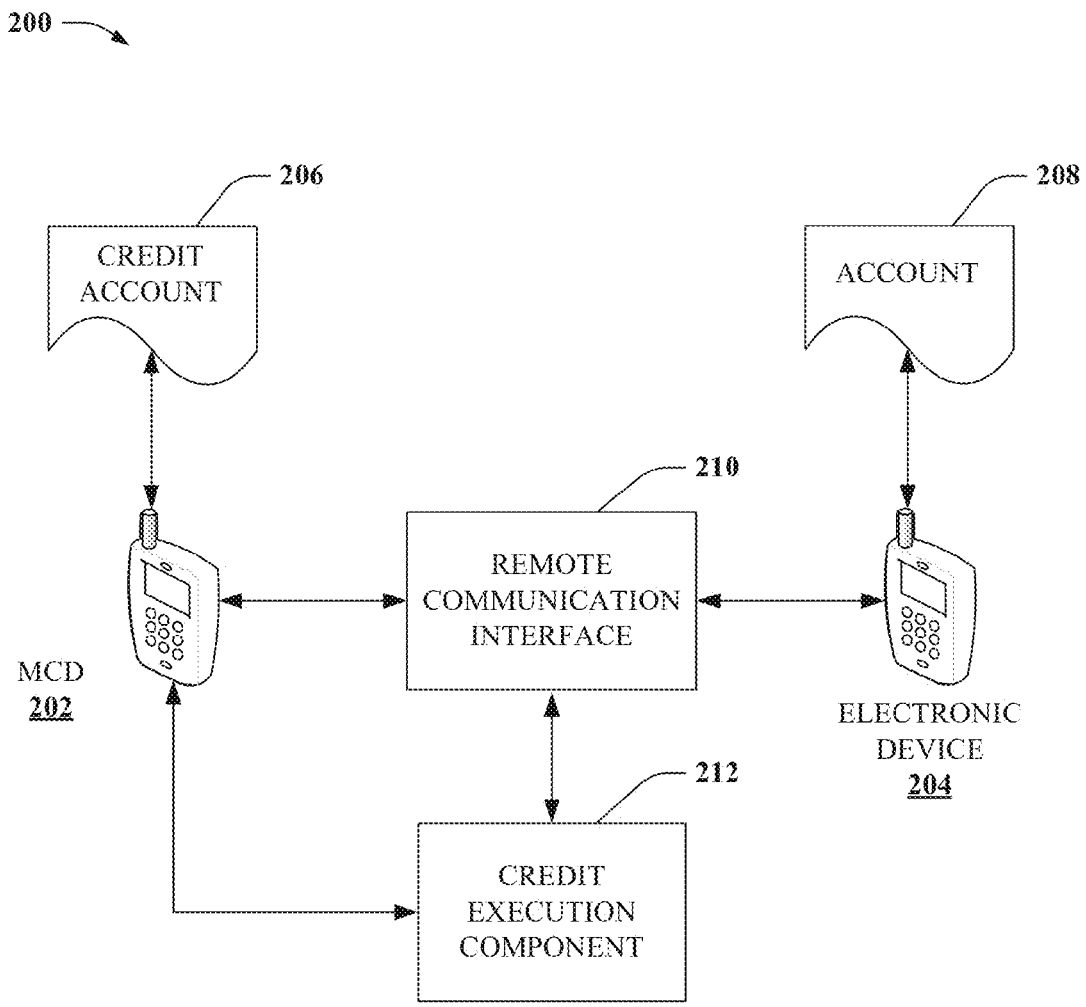
FIG. 2 depicts a block diagram of a sample system that provides a remote interface between electronic devices to facilitate credit transactions for an MCD credit account.

Management component 114 can utilize any suitable remote communication architecture (e.g., as depicted and discussed in more detail with respect to FIG. 2, infra) to accomplish synchronization of the credit account 102. For instance, a mobile communication network (e.g., a cellular network), a data network (e.g., the Internet), a radio frequency (RF) transmitter/receiver pair (e.g., RF identification-like device), or an optical transmitter/receiver pair (e.g., optical scanner or transceiver), or the like, or a combination thereof, can be utilized by management component 114 to interface the MCD 102 and the financial account server 108. Therefore, updates or requests at the financial account server 108 can be accomplished in order to synchronize transaction information at the MCD 104 and the financial account server 108 (e.g., to supervise the credit account 102, approve a transaction, provide billing statements, acknowledge and record payment information, provide credit benefits, facilitate account integrity and security, and so forth). As a result, where a conventional credit transaction could require a contemporaneous interface to an electronic server of a financial institution (e.g., to verify the credit account and/or receive transaction approval—often provided by a merchant over a telephone line), the MCD 102 and management component 114 can provide such access instead (or in addition). Accordingly, not only transactions with a commercial merchant can be accomplished, but peer to peer transactions as well.

By associating the credit account 102 with a unique ID 106 of an MCD 104 (and, e.g., with a social security number, PIN number, or the like, of a user of the MCD 104), credit transactions can be facilitated without providing a credit card, or reciting/entering account and/or expiration numbers, or other identifying information. The MCD 104 can store and provide such information to a transacting party (e.g., a merchant), and provide an interface to a financial account server 108 for synchronization (e.g., including transaction approval). Therefore, for instance, system 100 can conduct a purchase or payment between remote devices (e.g., see FIG. 2, infra), where funds are drawn from the credit account 102, via an MCD 104. As another example, a credit voucher (e.g., a pre-paid gift card, gift certificate, or the like) can be purchased via funds from an MCD account (102, 104) and transferred directly or indirectly to another account. Alternatively, the credit voucher can be sent to a physical address in the form of a physical gift card voucher or sent to an e-mail address as an e-gift card, and can be 'redeemed' by drawing on funds from the credit account 102. Purchase and/or transfer of the credit voucher can be initiated and conducted at the MCD 104.

In addition to the foregoing, security mechanisms can be incorporated in conjunction with an MCD credit account (102, 104). Security can be implemented so that only an authorized user can access credit transactions, and to reduce a likelihood that unauthorized access and/or use of the credit account (102) occurs (e.g., see FIG. 6). Thus, system 100 can provide for personal credit transactions by way of an MCD 104 instead of a credit card or credit card identification information (account number, expiration date, card ID number, etc.).

As used in this application, the terms "component", "system", "interface" "mechanism", and the like, are intended to refer to a computer and/or electronic-related entity, either hardware, software, software in execution, firmware, middle ware, microcode, and/or any suitable combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Moreover, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a mobile communication device (MCD). An MCD can also be called a subscriber unit, mobile station, mobile, remote communication device, or personal electronic device. A subscriber station can be a cellular telephone, a cordless telephone, a Session Initiation Protocol (SIP) phone, a multi-mode phone, a smart-phone, a personal digital assistant (PDA), a handheld device having remote connection capability (e.g., wired or wireless such as licensed cellular radio frequency [RF], unlicensed wireless, general RF transmission, optical transmission, and so on). In addition, the MCD can include any suitable processing device connected to a wireless modem, RF transceiver, optical transmitter or transceiver, or similar mechanism facilitating wireless communication with another processing device.

In addition to the foregoing, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to FIG. 2, a system 200 is depicted that facilitates commercial and/or peer to peer credit transactions by way of an MCD 202 and an electronic processing device 204 in accordance with additional aspects of the claimed subject matter. System 200 enables the MCD 202 to act as a credit card, both by associating the MCD 202 with a credit account 206 (e.g., as described supra at FIG. 1) and by interfacing the MCD 202 with an electronic processing device 204, located remote from the MCD 202, that is associated with another account (208). As a result, funds within the credit account 206 can be transferred to the other account (208) to affect a purchase, payment, or the like.

According to particular embodiments, system 200 can include a remote communication interface 210 that enables remote communication between the MCD 202 and a second communication device (204). The remote communication interface 210 can include a wired connection, such as an Ethernet cable, or the like, or various suitable wireless connections. For example, the remote communication interface 210 can utilize a mobile communication network (e.g., a cellular network) where suitable (e.g., if the MCD 202 and the electronic device 204 are both cellular communication devices or can access a suitable mobile communication network). Further, the remote communication interface 210 can be a data network such as the Internet, an intranet, and so on, an RF communication interface (e.g., including Bluetooth and like RF technologies), an optical frequency communication interface (e.g., an optical scanner and/or transmitter/receiver pair), or combinations of these or of like interfaces (210). In general, the remote communication interface 210 enables the MCD 202 and electronic processing device 204 to exchange information, including information related to a credit transaction.

According to further embodiments, system 200 can include a credit execution component 212 that transfers funds between the credit account 206 and the account 208 associated with the electronic device 204. The credit execution component can perform the transfer to facilitate a credit payment between such accounts (206, 208), or facilitate a credit purchase, or the like. The credit execution component 212 can include an electronic processor, for instance, that can facilitate the transaction between accounts (206, 208). Such a processor can execute an application that adds/debits funds for each account (206, 208), calculates a contemporaneous balance for each account (206, 208) (e.g., based on information regarding prior balance stored at each account [206, 208] if available), and/or records time, date, location, party identity, or product/service information (e.g., name, price, discounts or sales, coupons, gift certificates, etc.), or a combination thereof or of the like, associated with the transaction.

As a particular example of the foregoing, intended to illustrate but not to limit the disclosed subject matter, credit execution component 212 can reside at the MCD 202, as part of the remote communication interface 210, at the electronic device 204, or a combination of these or of other suitable locations. The credit execution component 212 can receive a name/identity of a product/service from one of the devices (202, 204), and obtain a price for the service/product from the electronic device 204. Once the price is determined, credit account 206 can be accessed by way of the MCD 202 to determine whether an available credit exceeds the price. If so, credit execution component 212 can debit the credit account 206 an amount equal to the price, and add to the account 208 a commensurate amount (equal to the price). Further, credit execution component 212 can calculate local taxes (e.g., stored in memory at the MDC 202, electronic device 204, or by the Internet access through the remote communication interface 210), fees, surcharges, or the like, and include such into the price and debit/credit the accounts (202, 204) accordingly.

As another, non-limiting example, a user can desire to transfer funds to another entity by way of a credit voucher (e.g., gift card, gift certificate, and so on, purchases from a bank, financial institution, commercial credit sponsor, etc.). For instance, user 'A' can purchase a gift card for $1000 to send to entity 'B' (e.g., a person, merchant, business, credit lender, financial institution, or the like). Entity 'B' can receive the gift card at a second device (204) and deposit the $1000 into any suitable account (208) associated with the second device (204). The account (208) need not be affiliated with a lender sponsoring the credit account (206) (e.g., the receiving account [208], associated with entity 'B', need not be affiliated with a bank that sponsors the credit account [206] from where the credit voucher funds originate.) Additionally, a credit voucher as described can be forwarded directly to an ATM machine, or like machine, to dispense a sum of cash for entity 'B', up to the voucher funds. Alternatively, or in addition, a portion of the $1000 credit voucher funds can be deposited into entity 'B's account (208) and another portion dispensed as cash at an ATM.

According to additional examples, a physical representation of the credit voucher (e.g., a plastic 'gift' card) can be purchased from the credit account 202 at the MCD 204 and mailed to a physical address to accomplish a transfer. The physical representation (or gift card) can enable an individual named on and/or possessing the gift card to redeem funds from the credit account 202. As a further example embodiment, the credit voucher could be sent as an electronic gift card (e.g., e-gift card) to an e-mail address, instant message address, and so on. A code contained within the e-gift card could then be utilized to redeem funds (e.g., $1000 in the above example) from the credit account 202. Like variations of the foregoing, although not specifically articulated herein, are also incorporated into the subject disclosure.

According to particular embodiments, credit execution component 212 can access one or more financial servers sponsoring the accounts (206, 208) to obtain transaction approval prior to facilitating a transaction. Alternatively, or in addition, transaction rules (established by a sponsoring entity) for the accounts (206, 208) can be obtained from respective devices (202, 204) and credit execution component 212 can allow or deny the transaction based on the transaction rules, without prior approval from a sponsoring entity itself. For instance, transaction rules could specify that transfer of funds from credit account 206 can occur without contemporaneous approval only if an available balance on the credit account 206 exceeds the amount of funds by 20% (e.g., for a $500 purchase/funds transfer, the available balance exceeds $600). If the transaction rule is satisfied, the transaction can be affected, if not, prior approval from a financial server (e.g., see FIG. 1 at 108) must be obtained before credit execution component 212 executes the transaction. As a result, a transaction can be facilitated according to predetermined rules established by a sponsoring credit entity, even if a contemporaneous link to the credit entity cannot be established at the time of the transaction (e.g., insufficient cellular coverage). Once a link to the credit agency can subsequently be established, the details of the transaction can be synchronized at a server associated with the credit entity (e.g., as described with respect to management component 114 at FIG. 1).

In accordance with one or more additional aspects, peer to peer transactions can also be facilitated by remote communication interface 210 and credit execution component 212. For example, if a user of MCD 202 desires to transfer funds to a friend, MCD 202 can be connected to the friend's MCD (204) (e.g., by way of a cellular network) in order to accomplish such a transfer. If the friend's MCD (204) has an account (208) associated with it, credit execution component 212 can facilitate a transfer of funds from the credit account 206 to the friend's account (208) (e.g., checking account, savings account, credit account, or the like) in a manner substantially similar to that described above. Specifically, a server of a financial entity sponsoring the credit account 206 can be consulted for transaction approval or the transaction can be facilitated in accordance with predetermined rules stored at the MCD 202 (and, e.g., synchronization with the server to update results of the transaction).

It should be appreciated that the electronic device 204 can be any suitable device that can be correlated to a financial account (e.g., checking, savings, credit, money market, certificate of deposit, etc.), or an electronic sum of funds. For instance, the electronic device 204 can be an ATM, an electronic cash register, a credit card reader (e.g., equipped with Bluetooth communication capabilities, optical transmission capabilities, a landline, wired, or wireless interface to a communication network [210], and so on), a second MCD as described herein, or any combination of these or like devices. System 200 therefore, can provide a mechanism for purchasing goods or services, transferring funds from person to person and/or entity to entity, commercial investment, and so on, via a mobile credit account (202, 206).

Figure 3:
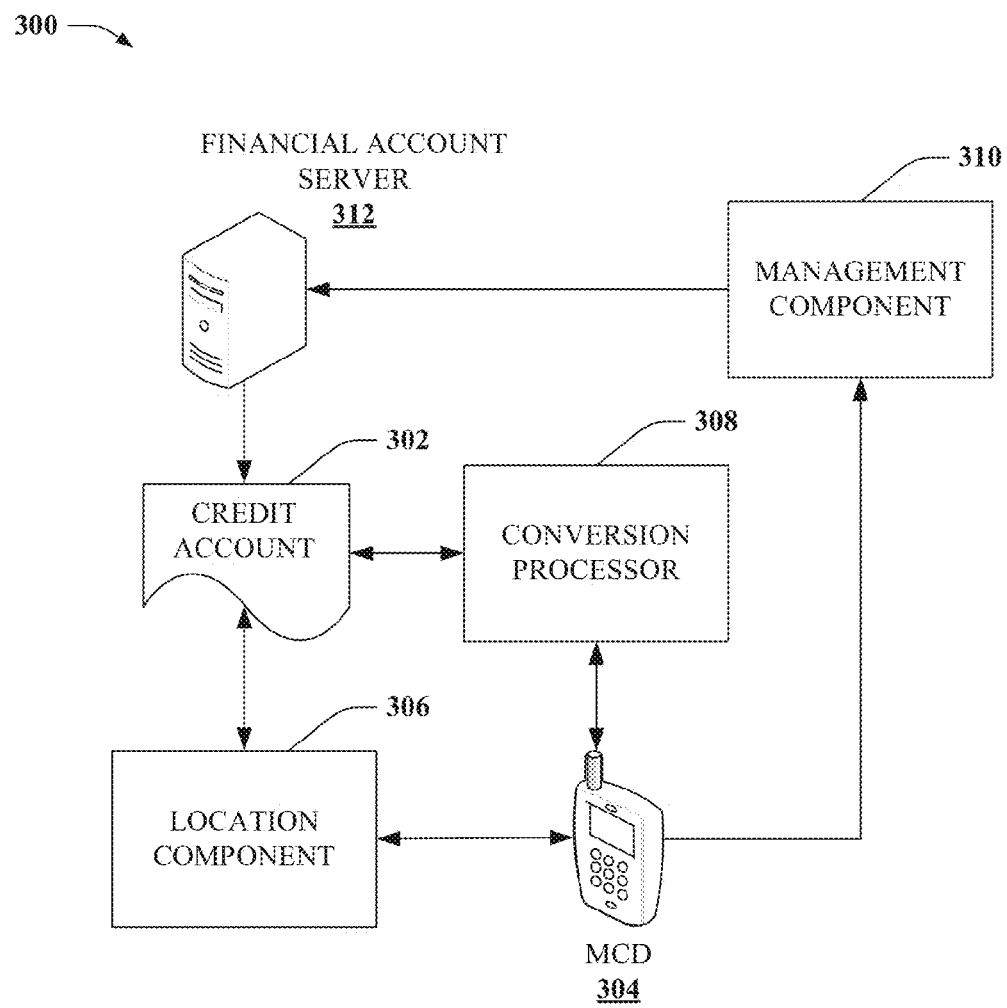
FIG. 3 illustrates a block diagram of a sample system that provides automated currency conversion based on data determined about an MCD.

Referring to FIG. 3, a block diagram of a sample system is depicted that can provide location and conversion features for an MCD (304) credit account 302 as described herein. Specifically, system 300 can determine a location of a device and perform suitable currency conversions appropriate for such location. If an MCD 304 travels from the United States to China, for instance, currencies associated with the credit account 302 can be displayed in Yen as opposed to Dollars. In addition, actual funds exchanged or disbursed (e.g., at an ATM) can be in Yen instead of Dollars. Such conversion can be maintained as long as the MCD 304 is located within China, or until a user specifies otherwise. Accordingly, system 300 can provide timesaving conversion features associated with the mobile device credit account 302.

In accordance with specific embodiments, system 300 can include a location component 306 that can determine a contemporaneous location of the MCD 304 or of a target account, or both. A target account can be a second financial account (e.g., see FIG. 2, supra, at 208) involved in a transaction with credit account 302. Due to the nature of electronic communication, the target account can be located in substantially any country of the world, and associated with any suitable currency. As a result, a location of the target account, as well as a location of the MCD 304, can be relevant to determining an appropriate currency (currencies) for a transaction.

Location component 306 can utilize any suitable mechanism for determining device/account location. For instance, a global positioning system (GPS) associated with the MCD 304 can provide such location. Other mechanisms, such as satellite triangulation systems, cellular base-station triangulation algorithms, or the like can be used as well. Alternatively, or in addition, an account (e.g., a target account discussed above) or an electronic interface to such account (e.g., MCD 304, financial account server 312) can store and provide a contemporaneous or default location of the account/device to the location component 306. For example, a mobile phone (304) can have a GPS unit associated with it, and therefore can provide a GPS location to the location component 306. In addition, the mobile phone (304) can store default information related to credit account 302, such as a default location for the account (302) or a default currency for the account. If, for instance, the credit account 302 is sponsored by an entity located in the United States, and a default 'location' of the account is in the United States, such information can also be provided to the location component 306. As a further example, a target account (e.g., a target of a funds transfer) or a device providing an electronic interface to the target account (e.g., an online transaction server [312]) can specify that a sponsoring entity is located in Europe and utilizes the Euro as a default currency (or other currency-related information). Information determined by the location component 306 can be provided to a conversion processor 308 to facilitate converting funds from one currency to another.

In accordance with other aspects, a conversion processor 308 can convert a balance of the credit account 302 or a transfer of funds to or from the credit account 302 from a first currency to a second currency. The second currency can be, for instance, appropriate for a contemporaneous location of the MCD 304 or of a target account, or both. For example, if the location component 306 determines the credit account 302 is based in Germany (or, e.g., sponsored by a German financial/commercial entity) and a target account is in Australia, conversion processor 308 can convert funds transferred between such accounts from German Deutsche Marks (DEM) to Australian Dollars (AUD). Alternatively, if the MCD 304 is located in Australia (e.g., determined by location component 306) and a transaction is initiated with an Australian merchant in Australia, funds from the credit account 302 can also be converted from DEM to AUD.

In order to provide accurate, up to date service, conversion processor 308 can access an updated database (not depicted) that provides contemporaneous conversion information. Such information can be based on daily fluctuations in market value of national currencies, or like factors. In addition, the updated database can be accessed by way of the Internet (or other suitable data network) or a wired or wireless interface with a server of a financial institution maintaining such information (e.g., see FIG. 1 at 108). Accordingly, conversion from one currency to another as described can be based on up to date conversion ratios.

In addition to the foregoing, system 300 can include a management component that can interface the MCD 304 with a financial account server 312 associated with the credit account 302. The management component 310 can provide a mechanism for synchronizing the financial account server 312 and the MCD 304, in order to update credit account transactions at the server 312. In such a manner, a financial entity sponsoring the credit account 302 can supervise transaction activity (e.g., allowing or denying a transaction). Supervision can be based on concurrent credit balance, comparison of concurrent credit balances, a ratio of balance to credit limit, an amount of a requested transaction, or a number of transactions undertaken in a threshold period of time, or a combination thereof, associated with the credit account 302 or a target account. The server 312 therefore provides a sponsoring credit entity with an ability to oversee transactions and ensure that rules associated with the credit account 302 are followed. As described, system 300 can provide additional convenience features related to financial transactions in a mobile environment.

Figure 4:
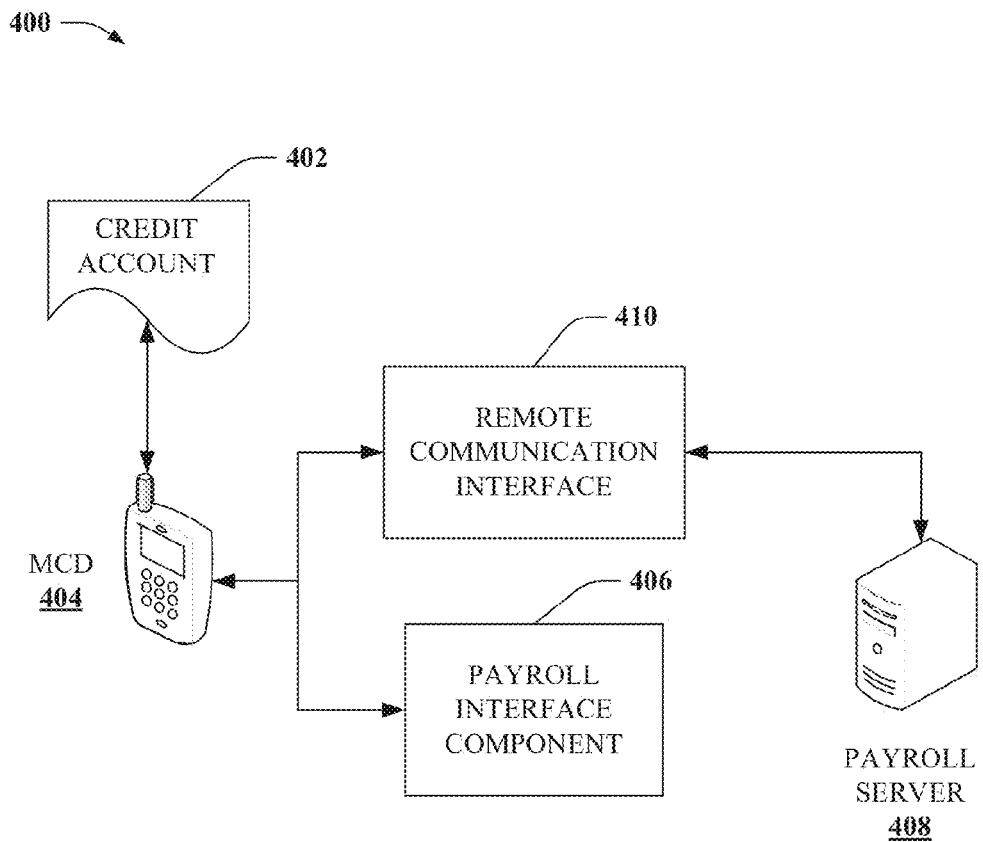
FIG. 4 depicts a block diagram of an example system that facilitates automated payroll deposit to an MCD credit account in accordance with various aspects.

FIG. 4 illustrates a block diagram of a sample system 400 that can provide automatic deposit of payroll funds to a mobile credit account 402 as described herein. Deposit to the account can be updated at an MCD 404 associated with the account by way of an interface to a server of a sponsoring entity (not depicted). Accordingly, additional features can be provided by system 400, either alone or in conjunction with aspects of the subject innovation described elsewhere herein.

According to specific embodiments, system 400 can include a payroll interface component 406 that couples the credit account 402 with a payroll server 408 and facilitates automatic deposit of payroll funds to the credit account 402. The payroll interface component 406 can couple the payroll server and MCD 404 and/or credit account 402 by way of a remote communication interface 410. The payroll server 408 can be an electronic interface to any suitable account usable for managing employer/employee payroll funds. To affect the automatic deposit, payroll interface component 406 can maintain a database that correlates an employee ID and a credit account 402 owned by a user of the MCD 404 (the employee). Funds disbursed to the employee ID by the payroll server 408 can be forwarded via the remote communication interface 410 to the credit account 402 by payroll interface component 406. It should be appreciated that such interface (410) can be any suitable interface for remote communication, described herein or known in the art (e.g., a mobile or cellular communication network, satellite communication network, data network such as the Internet, wired connection to such a network and so on).

As described, system 400 can provide an additional convenience feature(s) for subscribers of a mobile credit account (402, 404). Automatic payroll deposit can be a desired benefit in a mobile financial environment, either alone or in conjunction with other benefits provided herein, such as access to a credit account without need of credit card or card information, automated currency conversion, or sub-account creation and management (see FIG. 5, infra), or the like. As such, system 400 can provide substantial benefit over prior payroll deposit mechanisms by incorporating access to and interaction with a deposited account via an MCD 404.

Figure 5:
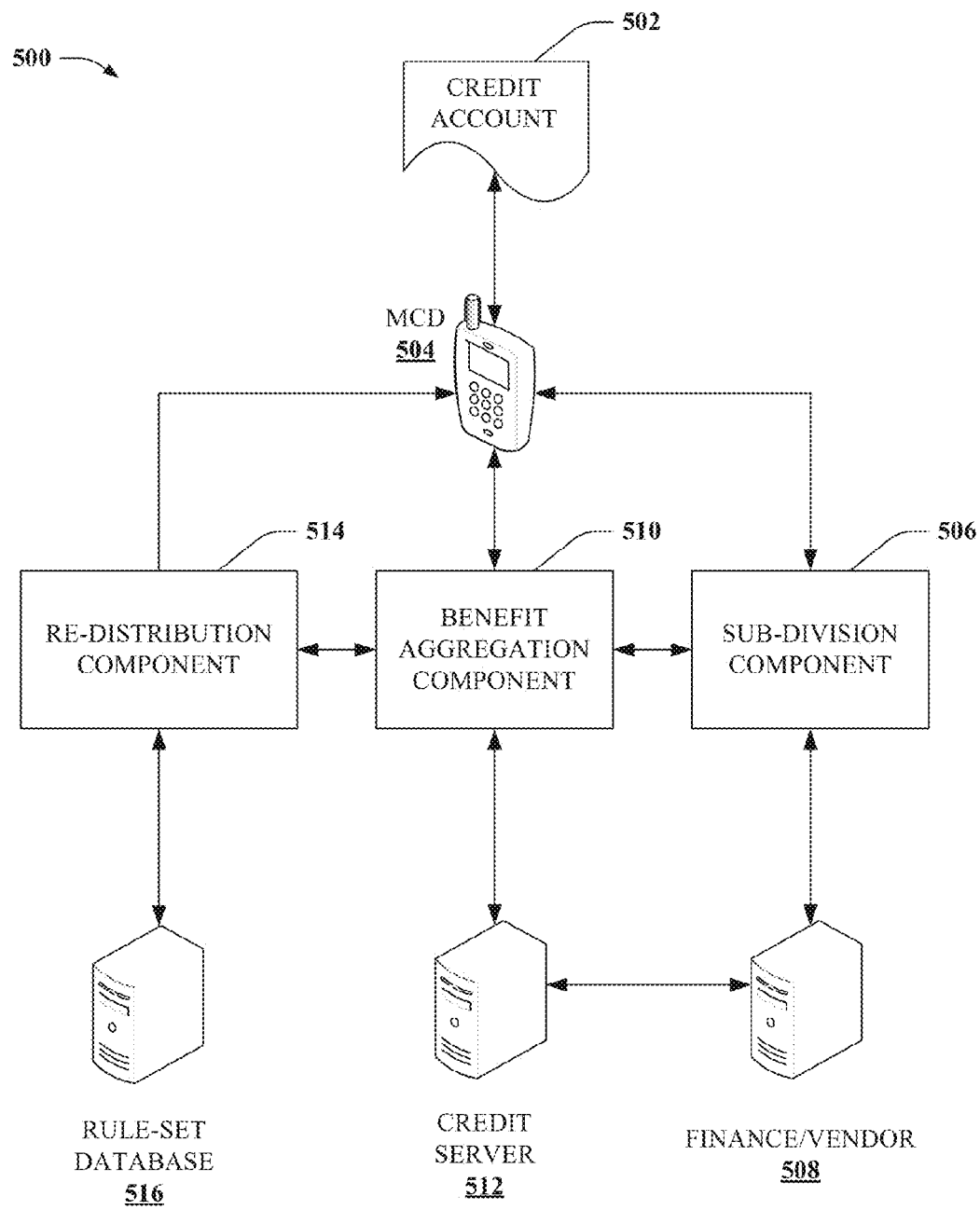
FIG. 5 illustrates a block diagram of a sample system that can sub-divide a credit account into sub-accounts sponsored by one or more entities, accumulate and manage benefits related thereto, and apportion credit amongst such accounts.

FIG. 5 illustrates a block diagram of a sample system that can sub-divide a credit account 502 into sub-accounts (not depicted) sponsored by one or more entities, accumulate and manage benefits related thereto, and distribute credit amongst such accounts. System 500 therefore, can take advantage of benefits (e.g., money back rewards, frequent travel points) offered by a credit purveyor by creating a sub-account, or adding a credit account, associated with an MCD 504 that is sponsored by the purveyor. Benefits provided by purveyors can be aggregated at the MCD 504 and displayed to a user in order to organize and manage the benefits. Accordingly, system 500 can enable a credit user to take advantage of the full range of benefits offered in conjunction with modern credit accounts.

According to particular aspects, system 500 can include a sub-division component 506 that can divide a credit account 502 into a plurality of sub-credit accounts (not depicted), where each of the sub-credit accounts can be affiliated with either a financial institution or a commercial vendor 508, or like entity that can extend a line of credit to a consumer. A credit line associated with the credit account 502 can be proportioned amongst the sub-accounts (see below). Alternatively, the sub-division component 506 can associate an additional line of credit to the sub-account(s), offered by a sponsor (508) of the sub-credit account. For example, a user can desire a Starbucks credit account affiliated with their mobile credit account (502, 504) in order to take advantage of credit benefits associated with such an account (e.g., money back on Starbucks purchases, discounts on Starbucks products, special promotional offers, acceptance by Starbucks of an MCD account [502, 504] as described herein, or the like). If granted, a Starbucks sub-account can be associated with MCD 504 in a manner similar to that described herein for a general credit account (502). As a result, qualifying purchases/activity can accrue benefits associated with the sub-account. The sub-account can be afforded credit by a sponsoring entity (508) (e.g., Starbucks) or optionally can be apportioned from a credit limit associated with a general credit account (502) affiliated with the MCD 504.

According to further aspects of the claimed subject matter, system 500 can include a benefit aggregation component 510 that can compile credit reward benefits provided by a financial institution or commercial vendor 508 sponsoring a credit account or sub-account. The benefit aggregation component 510 can store compiled benefits in MCD 504 memory, for instance. The benefits can be organized within a mobile application that aggregates benefits, keeps track of a state of such benefits, and displays the benefits on a display of the MCD 504. Additionally, benefit aggregation component 510 can notify a device user (e.g., by playing an audio ring tone at the MCD 504, displaying a notification, playing a voice recording, etc.) when a benefit can be used or accrued in conjunction with a transaction. For instance, if an initiated transaction involves a purchase of a product that can be discounted by expending an accrued credit benefit (e.g., credit discount, money back reward, etc.), the MCD 504 can display/playback an announcement of the benefit. Accordingly, a mobile credit account (502, 504) user can be alerted of accrued/available benefits in order to take advantage of such benefits.

According to further embodiments, benefit aggregation component can synchronize accumulation and expenditure of benefits at the MCD 504 and a credit server 512 associated with the financial institution or commercial vendor 508 sponsoring an account (502) or sub-account. Benefit aggregation component 510 can utilize a remote communication interface (not depicted) to exchange date with the credit server 512, as described herein or known in the art. Particularly, rules associated with benefit eligibility, expenditure and/or accumulation can be accessed at such server 512. Further, expenditure/accrual of credit benefits at the MCD 504 can be updated to the credit server 512 to facilitate synchronization of such benefits at the MCD 504 and the finance/vendor 508 supporting the sub-account.

In addition to the foregoing, system 500 can include a re-distribution component 514 configured to apportion available credit between the credit account 502 and one or more additional financial accounts associated with the MCD 504 or a user of the mobile communication device. For instance, if a credit line of a first sub-account is insufficient to support a particular purchase or transaction, re-distribution component 514 can attempt to apportion available credit associated with a general credit account (502) or a second sub-account to the first sub-account. Apportionment of credit can be in accordance with predetermined rules stored at a rule-set database 516. The rules can be established by one or more financial/commercial entities sponsoring the credit account(s) (502), for instance. Particularly, the rules can provide guidelines for the re-distribution component 514 to apportion available credit among multiple credit accounts (502) associated with MCD 504. The rules can be based at least in part on a concurrent credit balance, comparison of concurrent credit balances, a ratio of balance to credit limit, an amount of a requested transaction, or a number of transactions undertaken in a threshold period of time, or a combination thereof or of like factors associated with the credit account 502 or one or more sub-accounts.

According to additional embodiments, re-distribution component 514 can also request an extension of credit from a sponsoring financial/commercial vendor 508. If a credit line is insufficient to cover a desired transaction, as discussed above, re-distribution component 514 can access a remote server associated with the vendor (508) (e.g., by way of benefit aggregation component 510) and automatically request an extension of credit for an account (502) or sub-account. If a sufficient extension of credit is granted by the server 512, the credit account 502 and/or sub-account(s) can be updated at MCD 504 to reflect the additional line of credit and the transaction can be completed.

It should be appreciated that the rule-set database 516 can be stored at the MCD 504 and updated periodically by communication with the credit server 512, or a remote database accessed by re-distribution component 514 via a remote communication interface. System 500, as described, provides for shared credit value amongst multiple accounts. Shared value can facilitate optimal use of accounts sponsored by various entities and accrual of credit-related benefits provided by such entities. Accordingly, system 500 can provide additional management and apportionment benefits for a mobile credit account (502, 504) to assist a user in obtaining optimal use of such account, as described herein.

Figure 6:
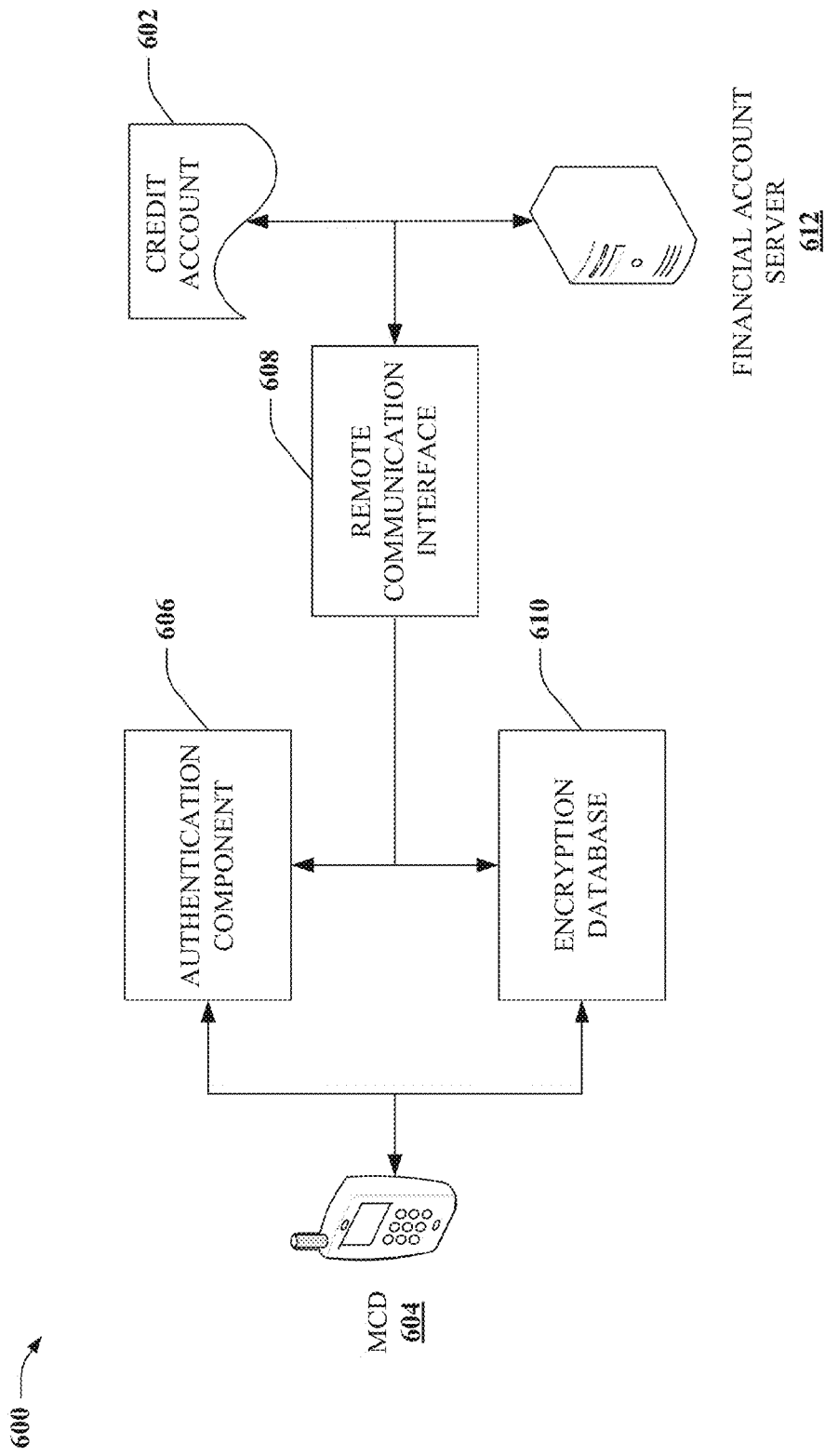
FIG. 6 depicts a block diagram of a sample system that provides secure interactions for remote credit transfer in accordance with one or more aspects.

FIG. 6 depicts a block diagram of a sample system 600 that can provide secure interactions for remote credit transfer in accordance with one or more aspects. Remote communication can be subject to unauthorized access by third party devices (not depicted). Particularly, concerning remote credit transactions as described herein, security for remote communication can be desired to maintain integrity of a credit account 602 and mitigate a likelihood that unauthorized users can access and appropriate funds associated with the credit account 602. System 600 can secure remote communication at least by encrypting transmitted data, so that account information cannot be extracted from such transmission, and by requiring user authentication prior to initiating a credit transaction on an MCD 604. It is to be appreciated that other mechanisms for securing remote transmissions and/or conditioning account (502) access on appropriate identification, known in the art or made known to one of skill in the art by way of the context provided herein, are incorporated into the subject disclosure.

According to one or more aspects, system 600 can include an authentication component 606 that can condition access to MCD 604 and a credit account 602 associated with the MCD 604 upon providing suitable identification. For instance, authentication component 606 can require entry of a username and/or password onto the MCD 604. Alternatively, or in addition, electronic identification technology, such as a finger/thumb print scan device can be employed by the authentication component 606 to verify an identity of a user of MCD 604. Additional mechanisms known in the art for identifying an identity of a user at a MCD (604) can also be incorporated in addition to or as alternatives to those described above. As a result, system 600 can provide a degree of security by conditioning access to credit or credit transactions by the MCD 604 on providing sufficient proof of identity.

According to further aspects, system 600 can include an encryption database 610 that can encrypt and decrypt data transmitted and received over a remote communication interface 606. Particularly, encryption database 610 can cryptographically protect and/or digitally sign data to decrease unauthorized, inadvertent and/or malicious access to transmitted data and credit account information. Encryption can essentially enable remote communication between the MCD 604 and a financial account server 612, including affecting a credit transaction thereby, to be protected.

Encryption database 610 can be used to cryptographically protect data during transmission and/or storage between devices (604, 612) or at a device (604, 612). For instance, an encryption algorithm can be employed to encode data. The algorithm is essentially a mathematical formula used to turn data into a secret code, unintelligible without access to a corresponding decryption formula or the like. For instance, an encryption algorithm can utilize a string of bits known as a 'key' to perform calculations pursuant to the mathematical formula. A larger number of bits in the key enable the formula to generate a greater number of alternative combinations, rendering the code harder to break and the encrypted data more secure.

A typical encryption algorithm can utilize a block cipher method, which codes fixed blocks of input that are typically from 64 to 128 bits (or more) in length. A decryption database 610 can be used to convert encrypted data back to an unencrypted form. According to particular aspects, a public key/private key pair can be used to encrypt and decrypt data upon transmission and receipt, respectively, by the MCD 604 or financial account server 612. As described, system 600 can employ suitable mechanisms to secure credit-related data transmitted by the MCD 604 and/or financial account server 612 to mitigate unauthorized intrusion into an associated account (602).

The aforementioned systems have been described with respect to interaction between several components. It should be appreciated that such systems and components can include those components or sub-components specified therein, some of the specified components or sub-components, and/or additional components. For example, a system could include mobile-credit interface component 112, MCD 104, electronic device 204, and credit execution component 212, or a different combination of these and other components. Sub-components could also be implemented as components communicatively coupled to other components rather than included within parent components. Furthermore, it should be noted that one or more components could be combined into a single component providing aggregate functionality. For instance, conversion processor 308 can include location component 306, or vice versa, to facilitate determining time, location and/or locale information of an MCD and performing an appropriate currency conversion based on such determination by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 7:
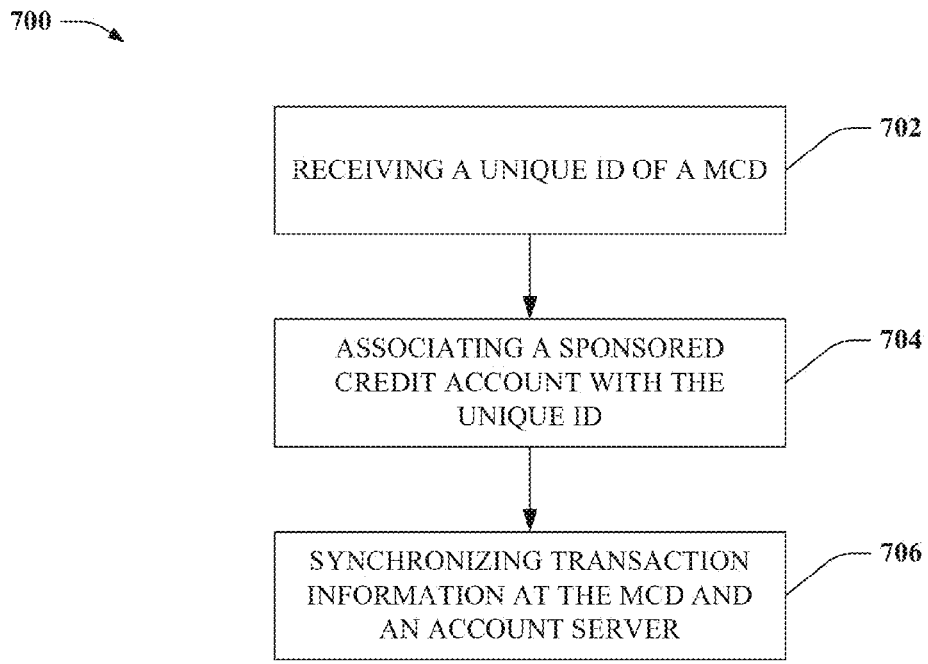
FIG. 7 illustrates a flowchart of a sample methodology for facilitating credit transactions for an MCD credit account in accordance with one or more aspects.
Figure 8:
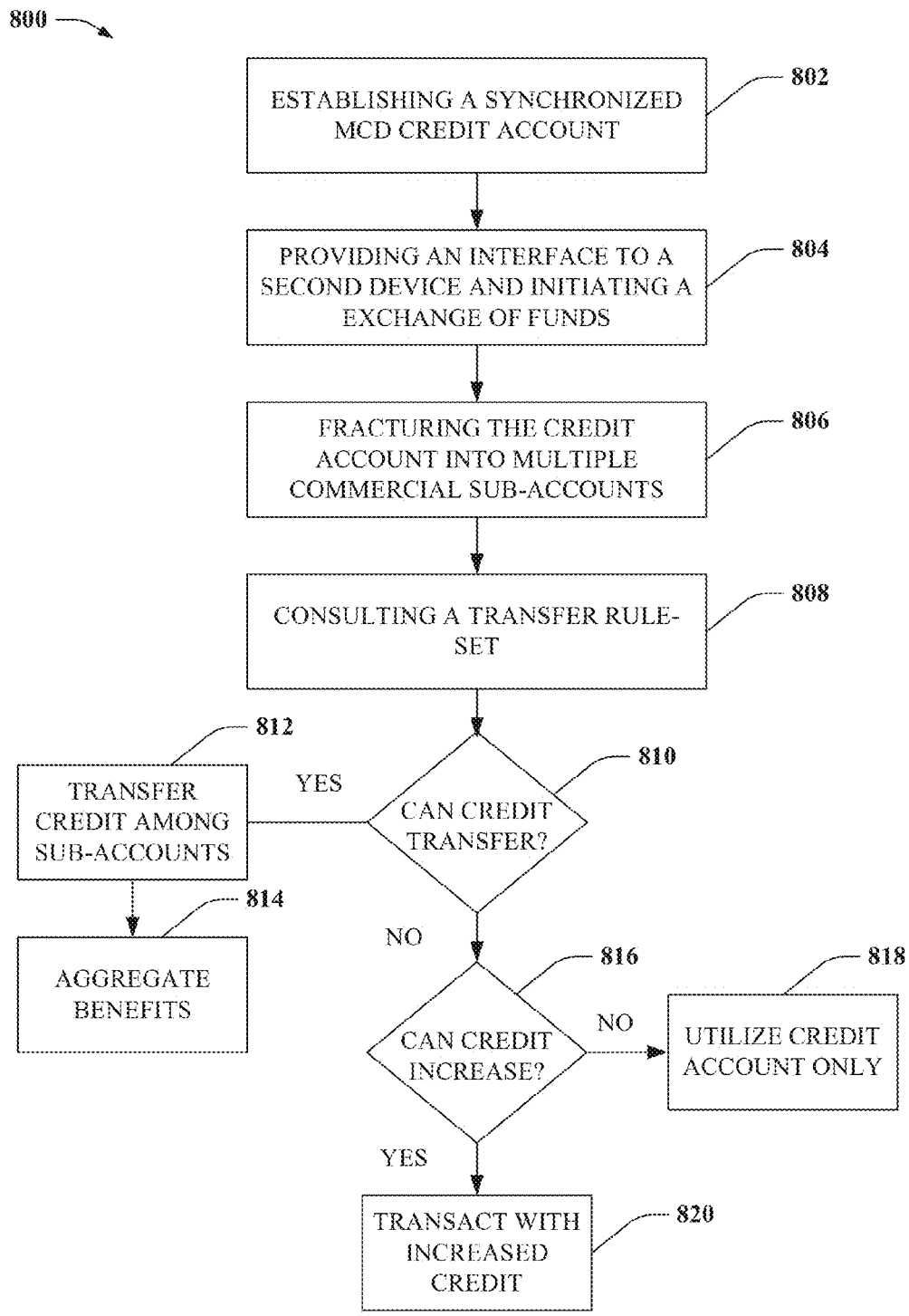
FIG. 8 depicts a flowchart of an example methodology for providing management of MCD credit and credit sub-accounts according to additional aspects.
Figure 9:
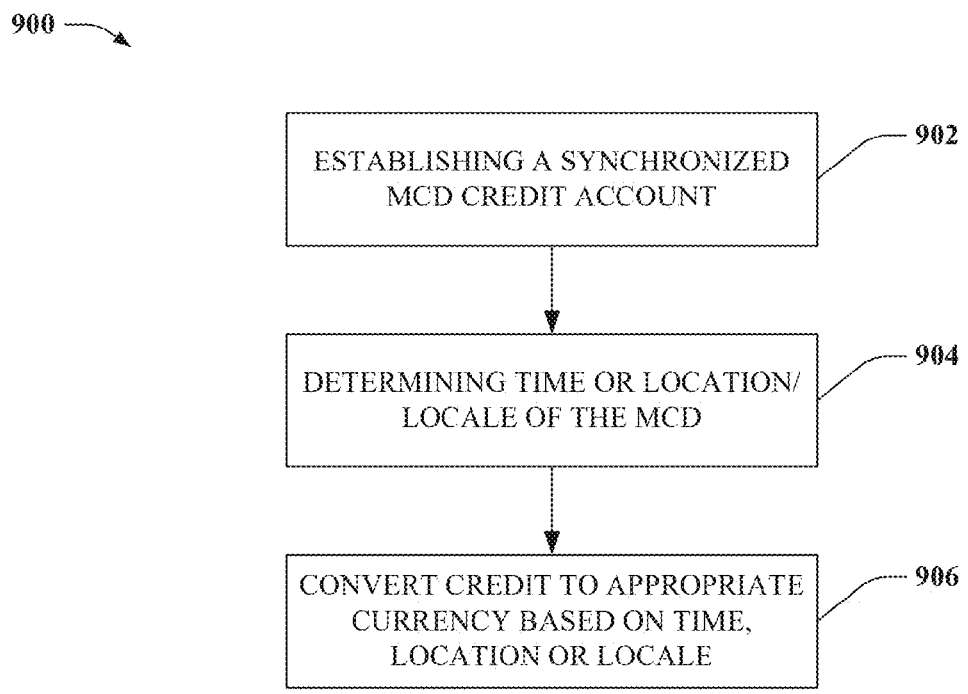
FIG. 9 illustrates a flowchart of an example methodology for providing automated currency conversion for an MCD credit account.

In view of the exemplary systems described supra, methodologies that may be implemented in accordance with the disclosed subject matter will be better appreciated with reference to the flow charts of FIG. 7 through 9. While for purposes of simplicity of explanation, the methodologies are shown and described as a series of blocks, it is to be understood and appreciated that the claimed subject matter is not limited by the order of the blocks. For instance, some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media as well as computer hardware including gates, circuits, and transistors, or the like.

FIG. 7 illustrates a flowchart of a sample methodology 700 for facilitating credit transactions for an MCD credit account in accordance with one or more aspects. Method 700, at 702, can receive a unique ID of an MCD. The unique ID can be a subscriber identity module (SIM) number, a serial number, or a code generated for purpose of associating the MCD with a financial account. Further, the unique ID can be any suitable sequence of numbers, letters, characters and/or symbols, of any suitable alphabet. The unique ID can also be encrypted by an encryption formula, as described herein or as known in the art. According to additional aspects, the unique ID can be received by way of a local communication interface, such as an electronic bus structure connecting two or more electronic devices, or a remote communication architecture as described herein.

Method 700, at 704, can associate a sponsored credit account with the unique ID. To accommodate this association, the unique ID can be paired with an owner, subscriber and/or user (referred to collectively as owner) of the MCD, for instance. As a particular example, an identifier associated with the owner can be paired or included within the unique ID of the MCD. Such identifier can be a PIN number or social security number, etc., that can uniquely identify the owner of the MCD. Credit history associated with the owner can be obtained utilizing the identifier (e.g., by way of a credit check with a commercial credit reporting agency) upon receipt of the unique ID, or upon pairing the identifier with the unique ID, or at any suitable prior and/or subsequent time.

According to particular aspects, the credit account can be sponsored by one or more commercial and/or financial entities (e.g., a bank, lending company, credit agency, commercial retail vendor, online retail vendor, or a combination of commercial vendor(s) and lending entities, and so on). Such entities can extend a line of credit for the credit account. By associating the credit account with the MCD, the line of credit is further extended to an owner of the MCD by way of the unique ID (and, e.g., owner identifier paired with the unique ID).

Method 700, at 706, can synchronize transaction information at the MCD and at a financial account server. For instance, information related to a concurrent balance, recent transaction history, or the like can be updated at the MCD and the financial account server. According to particular aspects, the financial account server can be operated by an entity (e.g., financial and/or commercial entity) sponsoring the credit account. As a result, by synchronizing information related to the account at both the MCD and the account server, the sponsoring entity can supervise and/or manage the credit account. For instance, billing statements and summaries can be compiled and sent to an MCD owner, and so on. The synchronization can occur by way of any suitable remote communication architecture. Examples can include a mobile communication network, a data network such as the Internet or an intranet (and/or, e.g., an Internet Protocol [IP] interface to such data network including a DSL line, cable IP line, satellite Internet connection, and so on), a satellite network, or even an optical and/or RF scanner/transmitter pair, or any suitable combination thereof or of the like.

According to still other aspects, a link between the MCD and an account server can be initiated prior to accomplishing a transaction. The link can be used to obtain authorization to conduct a transaction, for instance. If such is the case, synchronization of transaction-related information at the MCD and account server could also occur contemporaneous with execution of a transaction. Where authorization is not obtained via a direct link to the account server prior to and/or contemporaneous with executing the transaction, a set of transaction rules can be consulted and be used to guide the transaction. As a specific example, an MCD can contain a transaction authorization application stored at the MCD. The application can contain requirements specifying when a transaction can be conducted. If the requirements are met, the transaction can be executed, if not, the transaction is not executed, and the MCD can display a reason for the failed transaction. Under these circumstances, transactions can occur even if a contemporaneous link with the account server cannot be made at the time of the transaction (e.g., in an area with insufficient cellular coverage). Details about the transaction can be synchronized between the MCD and the account server at a suitable time in which such a link can be maintained.

As described, method 700 can provide for personal and/or commercial credit activity and transactions without use of a credit card or associated credit account information (e.g., account number, expiration date, etc.). An MCD, commonly carried for personal communications and computing, can initiate, manage and execute the credit activity instead. An account server of a sponsoring entity can be consulted prior to completing the transaction (e.g., to obtain approval) or after the transaction, to maintain synchronized account records at the MCD and account server. Accordingly, an interface between a credit purveyor and a consumer can utilize any suitable remote communication architecture, including wireless, to provide truly mobile credit access. A great benefit can be provided by the subject disclosure, as conventional mechanisms typically required at least a stationary connection to a credit server (e.g., over a phone line) by a merchant to complete a credit transaction. Instead, the subject innovation provides for truly mobile credit transactions, greatly enhancing consumer mobility and spending power.

FIG. 8 depicts a flowchart of a sample methodology 800 for providing management of MCD credit and credit sub-accounts according to additional aspects. Method 800, at 802, can establish a synchronized MCD credit account. Such a credit account can be established in substantially similar manner as described with respect to FIG. 7, supra. At 804, an interface to a second device can be provided enabling an exchange of funds between the MCD credit account and an account of the second device. The second device can be an ATM, an electronic cash register, an online server/database, a second MCD, an electronic server of a bank or lending institution, and so on. The second device can further be associated with one or more financial accounts (e.g., including a checking, savings, credit, certificate of deposit, money market account, or the like), such that the exchange of funds between the MCD credit account and the second device involves a credit or debit to the credit account of the MCD device and a corresponding debit or credit, respectively, to an account(s) associated with the second device. The exchange of funds can be a purchase of goods or services, payment of a bill, peer to peer credit transfer, transfer via a credit voucher, as described herein, or the like. In such a manner, commercial or peer to peer credit transactions can be accomplished utilizing at least one MCD.

At 806, a credit account associated with the MCD can be fractured into one or more sub-accounts. The sub-account(s) can be sponsored by one or more commercial and/or financial entities. At 808, a transfer rule-set can be consulted. The transfer rule-set can establish guidelines for determining whether available credit can be transferred from a first credit account (e.g., including a general credit account and/or one or more sub-accounts) to a second credit account associated with the MCD. At 810, a determination as made as to whether such a transfer can be accomplished in accordance with the guidelines. If so, method 800 proceeds to reference number 812 where credit is transferred among credit accounts associated with the MCD. At 814, benefits accrued from activity associated with sponsored accounts (e.g., including the general credit account and/or sub-accounts) are aggregated, stored and managed at the MCD. Benefits can include money back rewards, frequent usage points, frequent traveler points, discounts for merchandise and/or services provided by a particular vendor sponsoring an account(s) or business partners of a sponsor, and so on.

If, at 810, credit could not be transferred among accounts associated with the MCD in accordance with transfer guidelines, methodology 800 can proceed to 816 where a second determination can be made as to whether a credit increase is available for an account/sub-account. The credit increase can be based on additional guidelines governing credit limit increases (e.g., utilizing credit history of an owner of the MCD) stored at the MCD, or based on a credit limit extension approval provided by a sponsoring entity, as described herein. If, at 816, no credit increase is available for one of the sub-accounts, methodology 800 proceeds to 818 where a transaction is conducted utilizing only a general credit account associated with the MCD, if available. If a credit increase is available at 816, methodology 800 proceeds to 820 where a transaction can be initiated based on increased credit afforded to an account/sub-account.

As described, method 800 provides a logical flow governing management of a general purpose credit account at an MCD as well as additional sub-accounts. The sub-accounts, sponsored by a commercial and/or financial entity, can accrue valuable commercial benefits, such as frequent traveler miles and commercial/financial discounts. As a result, management and organization of sponsored sub-accounts can increase the value of such discounts and aid in maximizing potential savings and resulting benefits for an owner of the MCD.

Referring now to FIG. 9, a flowchart of an example methodology 900 is depicted for providing automated currency conversion for an MCD credit account based on contemporaneous location. Method 900, at 902, can establish a synchronized MCD credit account, as described herein. At 904, a time, location, and/or locale of the MCD can be determined. Time information can be obtained by way of a clock-type application stored and executed at the MCD. The time can be for a predetermined time zone (e.g., Eastern Standard Time, Eastern Daylight Time, and so on) or for a time zone specified/selected at the MCD. Alternatively, or in addition, time information can be obtained by a remote connection with a communication network, such as a cellular network or the Internet, which can provide concurrent time information for one or more time zones. Location information can be determined by any suitable location determination technique, such as triangulation algorithms utilized by cellular/mobile base stations maintaining a radio link with the MCD, satellite positioning systems (SPS), global positioning systems (GPS), or the like. Locale information can be determined by cross-reference the location with a data network and/or information server of a cellular/mobile network. For instance, such network/database can indicate that a particular location is near an urban area or rural area. More specifically, a location can be proximate a shopping district, downtown district of a metropolitan area, red light district, theatre district, sporting arena, and so on.

Method 900, at 906, can convert credit to an appropriate currency based on the time, location and/or locale information determined at reference number 904. More specifically, a transaction conducted in a particular region of the world (e.g., Germany) can be converted from a default currency to DEM, for instance. Additionally, if it can be determined (e.g., from the locale information) that an area of Germany that an MCD is concurrently at has a high Chinese population (e.g., a 'Chinese district' of a German metropolitan area), the MCD can offer to convert funds involved in a credit transaction into Chinese Yen, for instance. As a result, methodology 900 can automatically determine pertinent information related to commercial transactions based on time, location and locale information associated with an MCD, and provide automated conversion of currency from a default currency to one more suited to the determined information.

Figure 10:
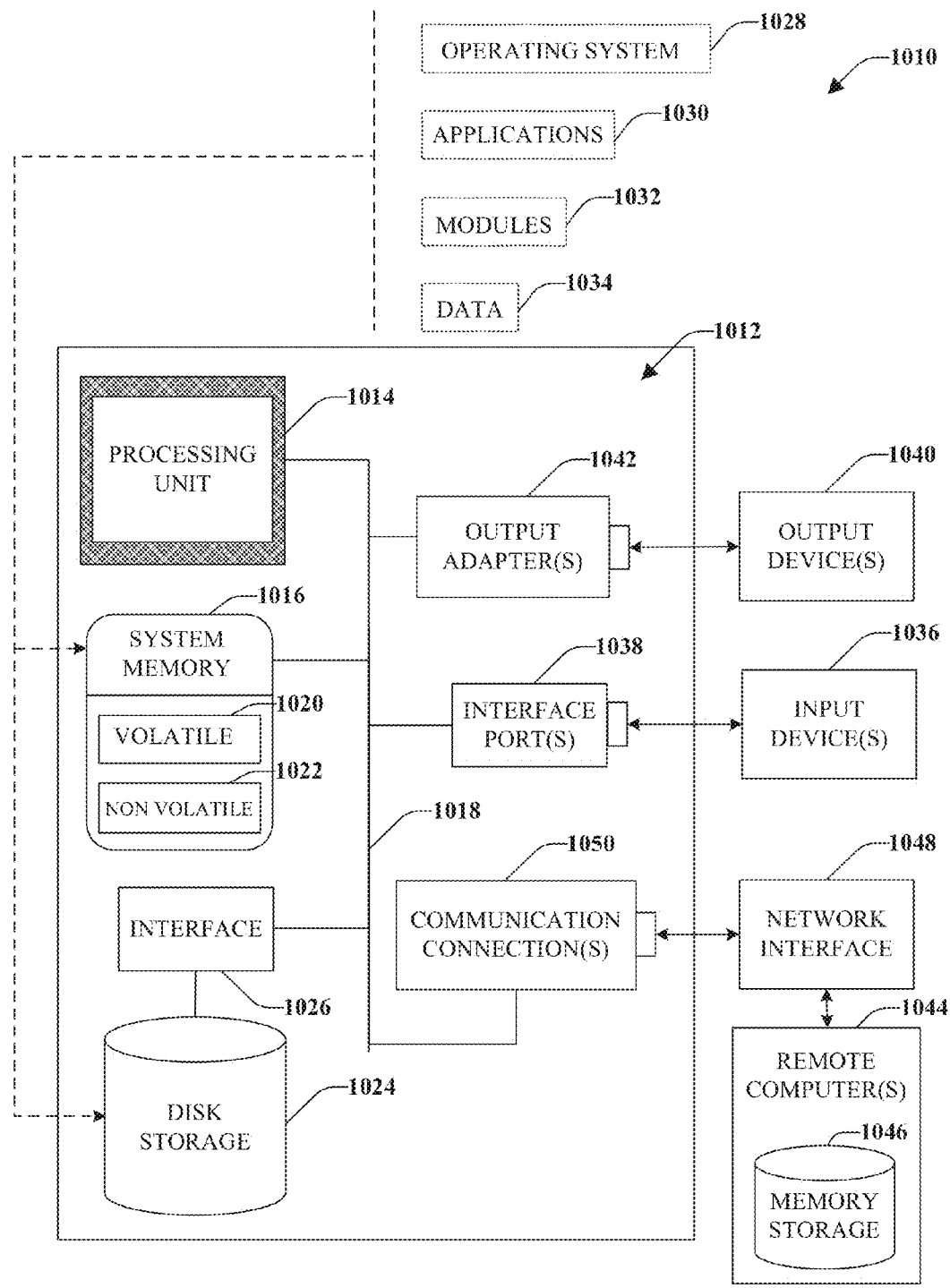
FIG. 10 depicts a sample operating system for implementing various aspects of the subject disclosure.

Referring now to FIG. 10, there is illustrated a block diagram of an exemplary computer system operable to execute aspects of the disclosed subject matter. In order to provide additional context for various aspects of the subject invention, FIG. 10 and the following discussion are intended to provide a brief, general description of a suitable computing environment 1000 in which the various aspects of the invention can be implemented. Additionally, while the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media as well as removable and non-removable media. By way of example, and not limitation, computer-readable media can comprise computer storage media and communication media. Computer storage media can include volatile and/or nonvolatile, removable and non-removable media implemented in any suitable method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the invention includes a computer 1002, the computer 1002 including a processing unit 1004, a system memory 1006 and a system bus 1008. The system bus 1008 couples components of system 1000 including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, wired networks (which use IEEE802.3 or Ethernet), etc. Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 9BaseT wired Ethernet networks used in many offices.

Figure 11:
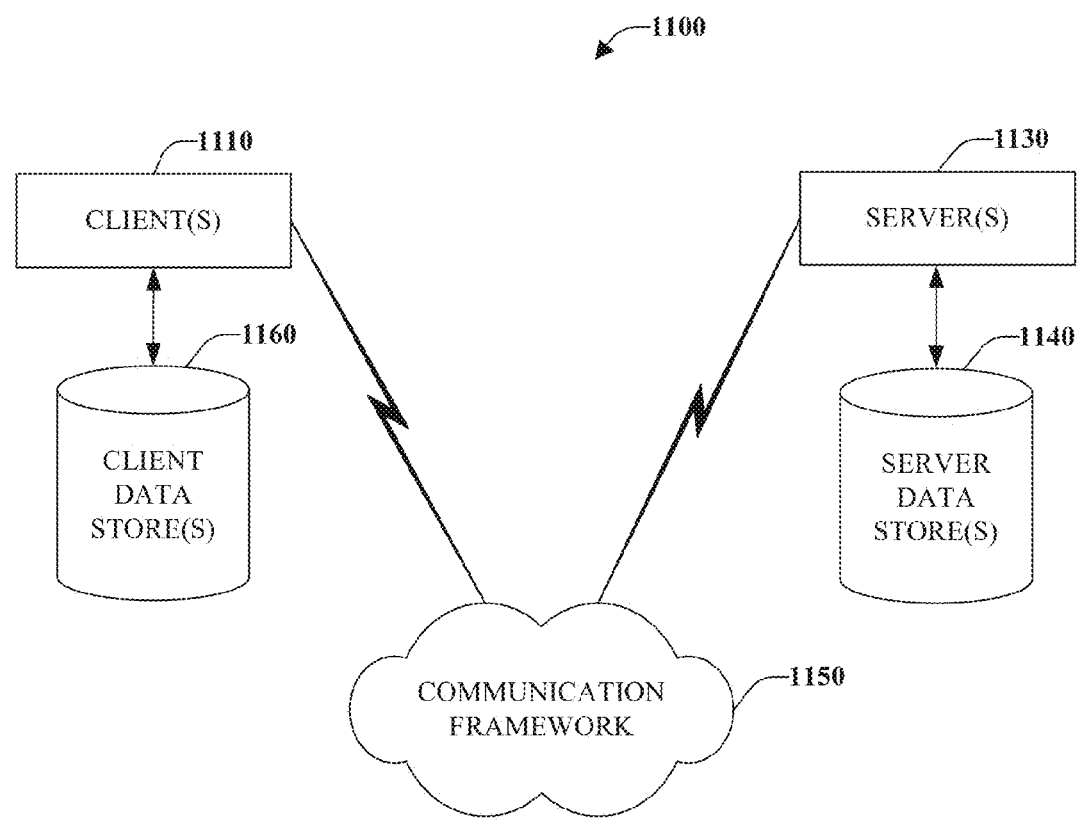
FIG. 11 depicts a sample remote communication environment to facilitate remote data exchange in accordance with one or more embodiments disclosed herein.

Referring now to FIG. 11, there is illustrated a schematic block diagram of an exemplary remote communication environment operable to execute aspects of the disclosed subject matter. The system 1100 includes one or more client(s) 1110. The client(s) 1110 can be hardware and/or software (e.g., threads, processes, computing devices). The client(s) 1110 can house cookie(s) and/or associated contextual information related to data exchanged between a first remote device (1110) (e.g., including a MCD) and a second remote device (1130) (e.g., including a financial account server) as described herein, for example.

The system 1100 also includes one or more server(s) 1130. The server(s) 1130 can also be hardware and/or software (e.g., threads, processes, computing devices). The servers 1130 can house threads to perform transformations by employing the invention, for example. One possible communication between a client 1110 and a server 1130 can be in the form of a data packet adapted to be transmitted between two or more computer processes. The data packet may include a cookie and/or associated contextual information, for example. The system 1100 includes a communication framework 1150 (e.g., a global communication network such as the Internet) that can be employed to facilitate communications between the client(s) 1110 and the server(s) 1130.

Communications can be facilitated via a wired (including optical fiber) and/or wireless technology. The client(s) 1110 are operatively connected to one or more client data store(s) 1160 that can be employed to store information local to the client(s) 1110 (e.g., cookie(s) and/or associated contextual information). Similarly, the server(s) 1130 are operatively connected to one or more server data store(s) 1140 that can be employed to store information local to the servers 1130.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes", "including", or variants thereof are used in either the detailed description or the claims, these terms are intended to be inclusive in a manner similar to the term "comprising".

What is claimed is:

1. A method for synchronizing a mobile communication device (MCD) with a credit account, comprising:
associating a unique ID of a MCD with a credit account, the unique ID corresponding to a user of the MCD, the credit account sponsored by a financial entity;
dividing the credit account into one or more sub-credit accounts;
apportioning credit from a credit line of the credit account to at least some of the one or more sub-credit accounts;
initiating a transaction on behalf of the MCD;
obtaining transaction approval for the transaction based on one or more predetermined transaction rules and no link between the credit account sponsored by the financial entity and the MCD at the time of the transaction; and
synchronizing a server of the financial entity with the MCD based on the transaction initiated by the MCD, wherein the synchronizing occurs when a link between the server of the financial entity and the MCD is available, and
wherein at least some of at least one of the associating, initiating, obtaining, or synchronizing are implemented at least in part via a processing unit.

2. The method of claim 1,
the synchronizing comprising synchronizing a state of the credit account on the server of the financial entity with a state of the credit account on the MCD.

3. The method of claim 1,
the synchronizing based on at least one of a credit limit, credit balance, transaction history, expenditure, payment, debit, or credit associated with the credit account.

4. The method of claim 1, comprising
alerting the user of the MCD of an accrued benefit or an available benefit based on at least one of the transaction, a benefit of the credit account or a benefit of a sub-credit account of the credit account.

5. The method of claim 1, comprising
calculating a local tax based on the transaction and a location of the MCD.

6. The method of claim 1, comprising
converting a first currency of the transaction to a second currency based on at least one of a location of the MCD or a locale of the MCD.

7. The method of claim 1, comprising
encrypting at least one of the unique ID of the MCD, data associated with the transaction, or data associated with synchronization between the server of the financial entity and the MCD.

8. A system for synchronizing a mobile communication device (MCD) with a credit account, comprising:
a mobile-credit interface component configured to associate a unique ID of a MCD with a credit account, the unique ID corresponding to a user of the MCD, the credit account sponsored by a financial entity;
a sub-division component configured to divide the credit account into a plurality of subcredit accounts;
a re-distribution component configured to apportion credit from a credit line of the credit account to at least some of the one or more sub-credit accounts;
a credit execution component configured to initiate a transaction on behalf of the MCD and to approve or deny the transaction in the absence of a link to the financial entity; and
a management component configured to synchronize a server of the financial entity with the MCD based on the transaction initiated by the MCD when a link between the server of the financial entity and the MCD is available, wherein at least some of at least one of the mobile credit interface component, the credit execution component, or the management component is implemented at least in part via a processing unit.

9. The system of claim 8, the credit execution component configured to calculate at least one of a local tax, a fee, or a surcharge for the transaction based on at least one of a location of the MCD or a locality of the MCD.

10. The system of claim 8, comprising a remote communication interface configured to enable communication between the MCD and a second electronic device, the second electronic device associated with a second unique ID and a second credit account.

11. The system of claim 10, the credit execution component configured to initiate the transaction on behalf of the MCD and at least one of:
transfer funds from the credit account associated with the MCD to the second credit account associated with the second electronic device; or
transfer funds from the second credit account associated with the second electronic device to the credit account associated with the MCD.

12. The system of claim 8, comprising a payroll interface component configured to:
correlate an employee ID of the user of the MCD with the credit account; and
disburse payroll funds to the credit account based on the employee ID and payroll information from a payroll server.

13. The system of claim 8, comprising a benefit aggregation component that compiles credit reward benefits provided by the financial entity institution or a commercial vendor and stores compiled reward benefits in MCD memory.

14. A non-transitory computer readable storage medium including executable instructions, which when executed on a processor perform a method comprising:
associating a unique ID of a MCD with a credit account, the unique ID corresponding to a user of the MCD, the credit account sponsored by a financial entity;
dividing the credit account into one or more sub-credit accounts;
apportioning credit from a credit line of the credit account to at least some of the one or more sub-credit accounts;
initiating a transaction on behalf of the MCD;
obtaining transaction approval for the transaction based on one or more transaction rules and no link between the credit account sponsored by the financial entity and the MCD at the time of the transaction; and
synchronizing a server of the financial entity with the MCD based on the transaction initiated by the MCD, wherein the synchronizing occurs when a link between the server of the financial entity and the MCD is available.

15. The computer readable storage medium of claim 14, comprising
suggesting use of a benefit associated with the credit account in conjunction with the transaction based on a benefit availability.

16. The computer readable storage medium of claim 14, comprising
determining a location of the MCD.

17. The computer readable storage medium of claim 14, comprising
supervising transaction activity based on at least one of a credit balance, utilization ratio, or a number of transactions within a time period, wherein the supervising is accomplished by the financial entity.

\* \* \* \* \*